United States Patent
YangGong et al.

(10) Patent No.: US 10,365,698 B2
(45) Date of Patent: Jul. 30, 2019

(54) TEMPERATURE BASED FREQUENCY THROTTLING

(71) Applicant: Oracle International Corporation, Redwood City, CA (US)

(72) Inventors: Yifan YangGong, Milpitas, CA (US); Sebastian Turullols, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 15/661,372

(22) Filed: Jul. 27, 2017

(65) Prior Publication Data

US 2019/0033931 A1    Jan. 31, 2019

(51) Int. Cl.
*G06F 1/32*     (2019.01)
*G06F 1/20*     (2006.01)
*G06F 1/324*    (2019.01)
*G06F 1/3296*   (2019.01)

(52) U.S. Cl.
CPC .............. *G06F 1/206* (2013.01); *G06F 1/324* (2013.01); *G06F 1/3296* (2013.01)

(58) Field of Classification Search
CPC ..... G06F 1/32; G06F 9/44; G06F 1/26; G06F 1/28
See application file for complete search history.

(56) References Cited

U.S. PATENT DOCUMENTS

| 8,645,888 B2 | 2/2014 | Tetelbaum | |
| 2005/0258894 A1* | 11/2005 | Levit | G06F 1/3203 327/544 |
| 2009/0271141 A1* | 10/2009 | Coskun | G06F 1/206 702/132 |
| 2013/0297094 A1 | 11/2013 | Yao | |
| 2014/0215253 A1 | 7/2014 | Klassen | |
| 2014/0215429 A1 | 7/2014 | Bickford | |
| 2014/0324245 A1 | 10/2014 | Kwon | |
| 2015/0134995 A1* | 5/2015 | Park | G06F 11/3058 713/340 |
| 2015/0241955 A1* | 8/2015 | Kosonocky | G06F 1/3296 713/320 |
| 2016/0314229 A1* | 10/2016 | Bickford | G06F 17/5031 |

* cited by examiner

*Primary Examiner* — Jaweed A Abbaszadeh
*Assistant Examiner* — Keshab R Pandey
(74) *Attorney, Agent, or Firm* — Meyertons, Hood, Kivlin, Kowert & Goetzel, P.C.

(57) ABSTRACT

A power management controller is disclosed. Broadly speaking, the controller may, in response to receiving a timing signal, monitor a temperature of an integrated circuit including multiple processor clusters. The controller may generate a comparison of the temperature and a threshold value, and in response to a determination that the comparison indicates that the temperature is less than the threshold value, transition a particular processor cluster to a new power state.

20 Claims, 8 Drawing Sheets

TEMPERATURE BASED FREQUENCY THROTTLING

BACKGROUND

Technical Field

Embodiments disclosed herein relate to computing network systems, and more particularly, to performance management of computing systems.

Description of the Relevant Art

Computing systems typically include a number of interconnected integrated circuits. In some cases, the integrated circuits may include one or more processors or processor cores. The integrated circuits may also include memory circuits configured to store program instructions for execution by the processor or processor cores.

During operation, a processor or particular processor core may retrieve program instructions from a memory, and execute the retrieved instruction to perform a particular function or operation. As part of the execution of the program instructions, the processor or processor core may additionally retrieve data from the memory. Using the retrieved data, the processor or processor core may perform an operation, such as, e.g., multiplication, addition, or any suitable operation, to generate a result. The processor or processor core may then store (commonly referred to as "write") the result into the memory.

As a processor or processor core retrieves the program instructions, performs the operation, and the like, the processor or processor core draws current from a power supply to execute the particular task. The amount of current drawn from the power supply may be a function of a number of individual tasks the processor or processor core may be executing during a particular period of time. In some cases, a processor or processor core may draw current during a period of time when the processor or processor core is not executing any tasks.

SUMMARY OF THE EMBODIMENTS

Various embodiments of a data system are disclosed. Broadly speaking, an apparatus and a method are contemplated, in which a controller circuit may be configured to, in response to receiving a timing signal, monitor an aggregate temperature of an integrated circuit, which includes one or more processor clusters, a particular one of which includes a plurality of processor cores. The controller circuit may then generate a comparison of the aggregate temperature to a threshold value, and in response to a determination that the comparison indicates that the aggregate temperature is less than the threshold value, transition a particular processor cluster of the one or more processor clusters from a current power state to a new power state. The system may be configured such that, an operating frequency of the processor cluster in the new power state is less relative to the current power state.

In one embodiment, the controller circuit may be further configured to determine a current voltage level of a power supply coupled to the processor cluster.

In another non-limiting embodiment, the threshold value may be based upon the current voltage level of the power supply coupled to the particular processor cluster.

FIG. illustrates a flow diagram depicting an embodiment of a method for adjusting performance of an integrated circuit based on temperature.

Figure 3:
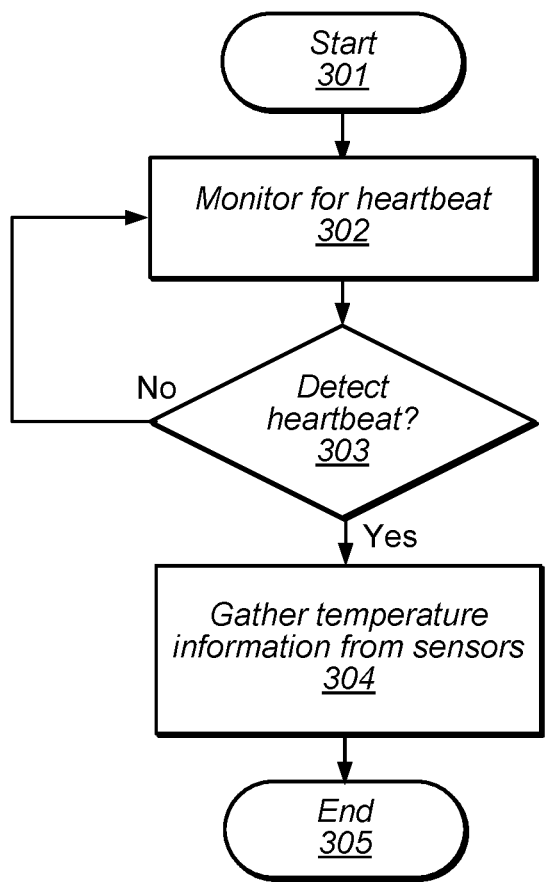

FIG. 3 illustrates a flow diagram depicting an embodiment of a method for gathering temperature data associated with an integrated circuit.

Figure 4:
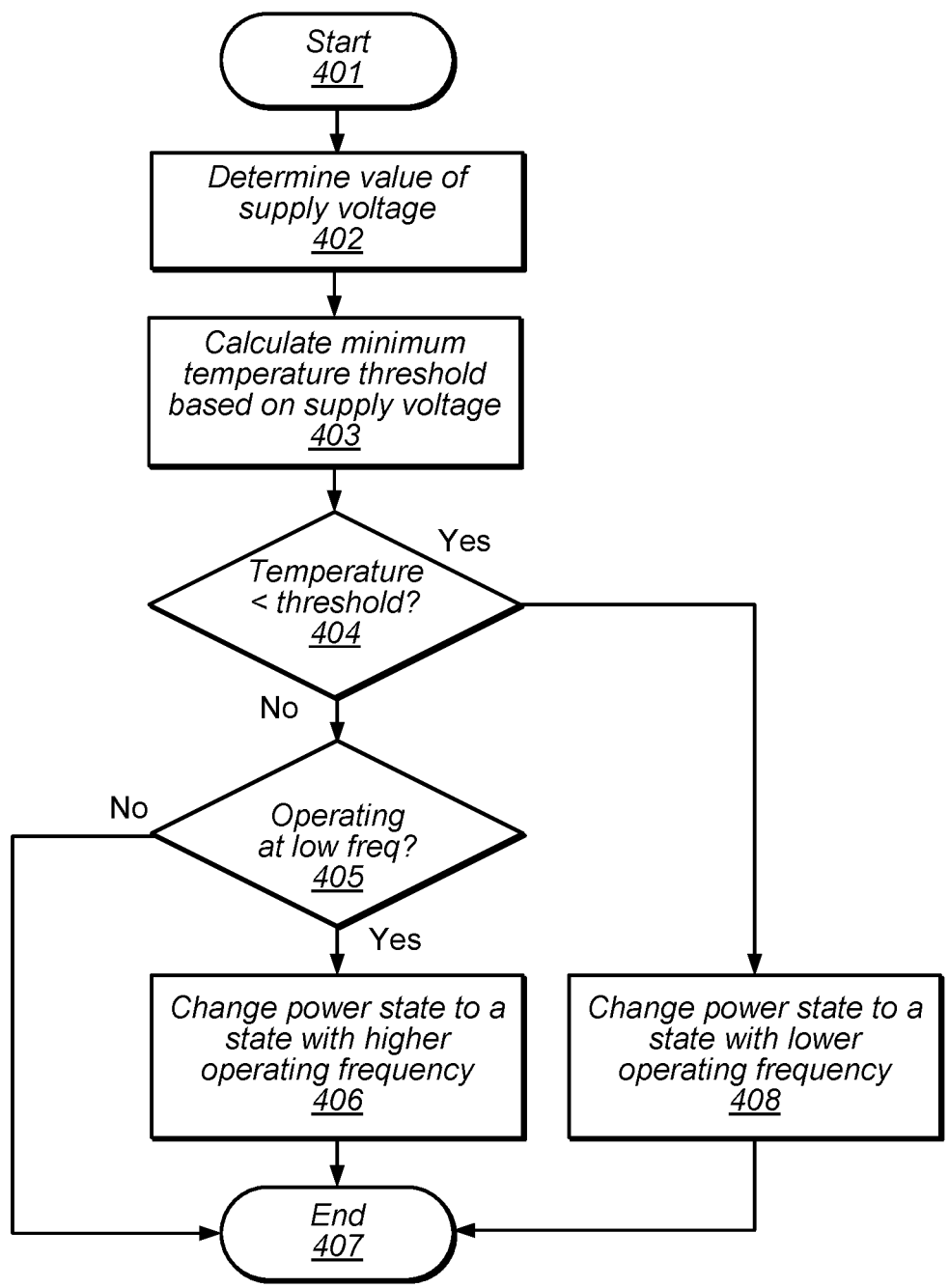

FIG. 4 illustrates a flow diagram depicting an embodiment of a method for adjusting operating frequency based on temperature.

Figure 5:
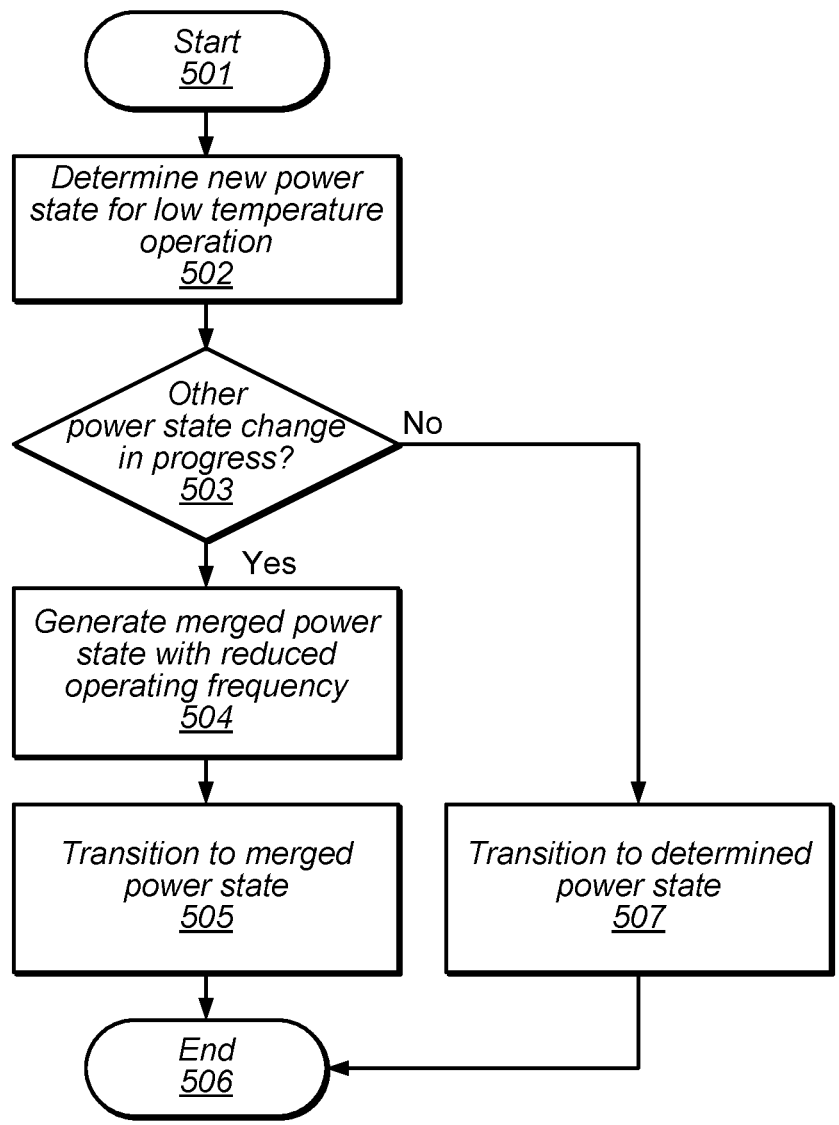

FIG. 5 illustrates a flow diagram depicting an embodiment of a method for transitioning to a new power state.

Figure 6:
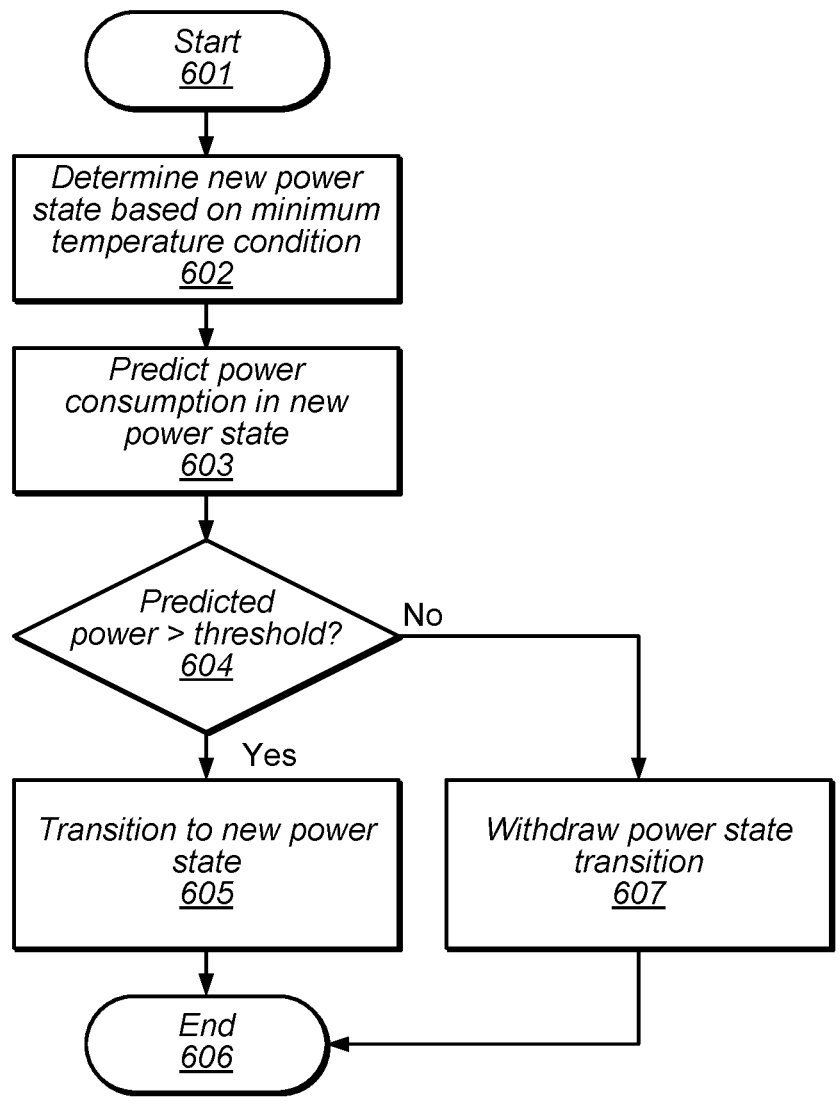

FIG. 6 illustrates a flow diagram depicting an embodiment of another method for transitioning to a new power state.

Figure 7:
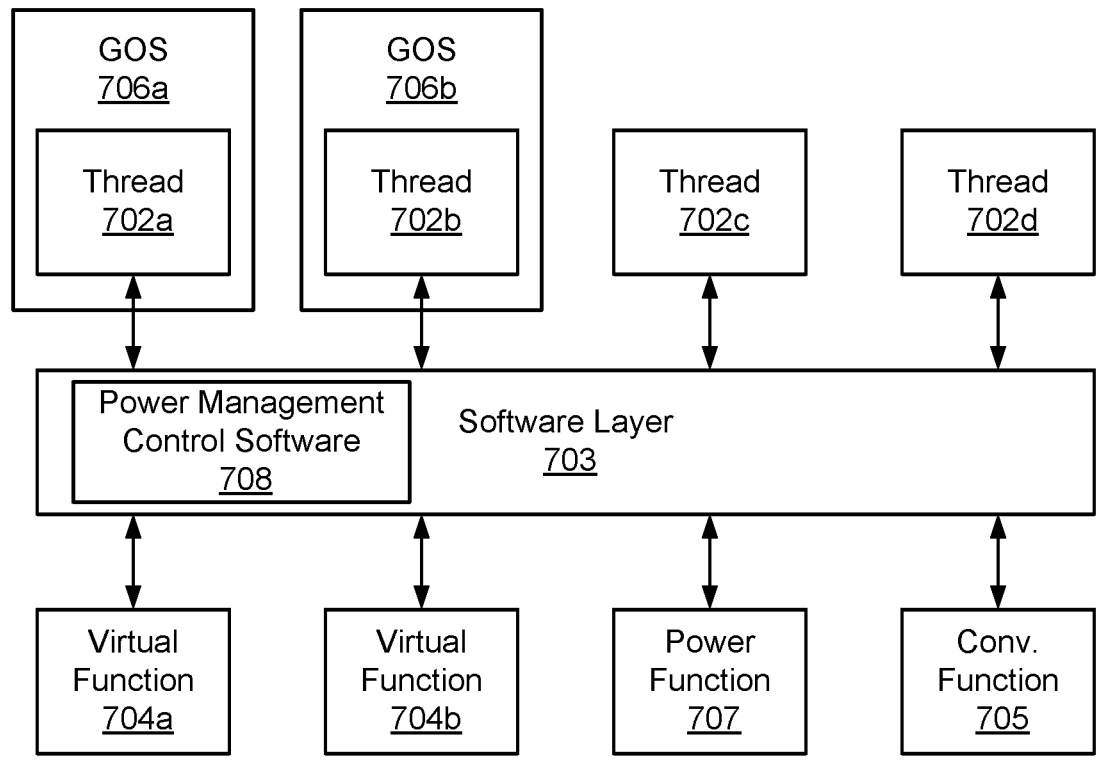
Figure 8:
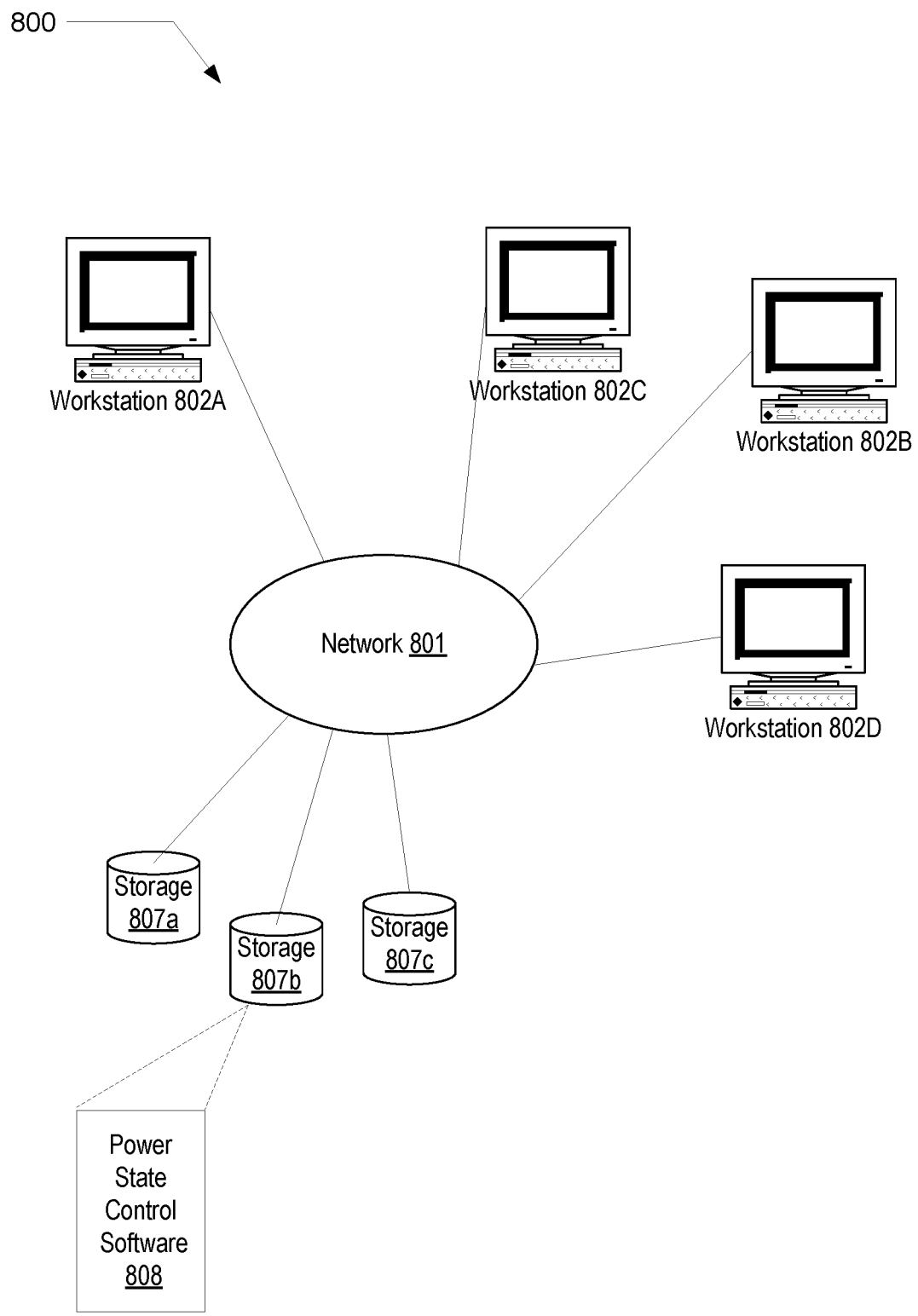

FIG. 7 is a block diagram illustration an implementation of power management control functions FIG. 8 is a block diagram of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Computing systems included multiple integrated circuits manufactured using a semiconductor manufacturing process. Once a particular integrated circuit is manufactured, the integrated circuit may be tested to verify that it meets performance goals. Such testing may be performed using a range of test data, and at a variety of power supply voltage levels and temperature combinations.

In some cases, transconductance devices, such as, e.g., metal-oxide semiconductor field-effect transistors (MOSFETs), may exhibit a change in the current carrying capabilities as a function of temperature. The ability for some MOSFETs to carry current may be reduced as the temperature decreases in an effect commonly referred to as "temperature inversion." During testing, integrated circuits that suffer from temperature inversion may be rejected, thereby reducing yield and increasing cost. The embodiments illustrated in the drawings and described below may provide techniques for compensating for temperature inversion, thereby improving yield and reducing cost.

As previously mentioned, some modern integrated circuits exhibit slower operation at low temperatures due to temperature inversion. During temperature inversion, individual MOSFETs may not be able to pass current between their respective sources and drains at the same level, for a given combination of gate-to-source and drain-to-source voltages, as when temperature inversion is not occurring. Since the devices' current carrying capability is limited, the speed of a circuit including such devices is limited. Rather than discarding such devices as part of manufacturing loss, the performance of a logic circuit, processor, or processor core, may be adjusted to accommodate the weakened devices.

Figure 1:
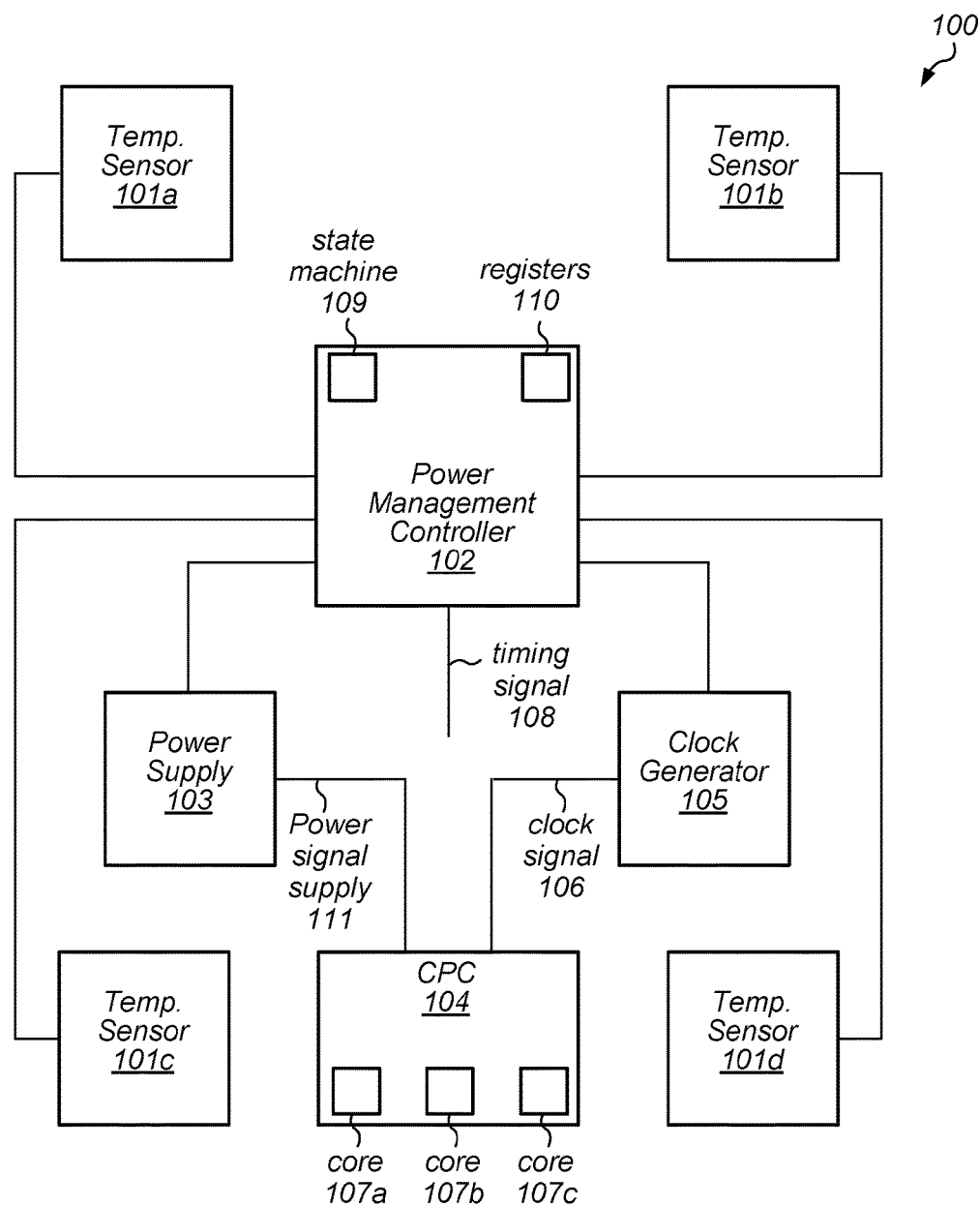
FIG. 1 is a generalized block diagram illustrating an embodiment of an integrated circuit.

An embodiment of a computing system is illustrated in FIG. 1. In the illustrated embodiment, computing system 100 includes sensors 101a-d, power management controller (PMC) 102, power supply 103, clock generator 105, and core processor cluster (CPC) 104.

As described below in more detail, PMC 102 may be configured to adjust the power state of a CPCs include in computing system 100. PMC 102 may, in response to detection of timing signal 108, calculate a total power consumption of computing system 100. Using the total power consumption, performance metrics may be determined and compared to caps or limits. Based on the comparison, PMC 102 may adjust the power state of CPCs, such as, e.g., CPC 104, included in the computing system 100 to meet the caps and limits. Any suitable circuit block included in computing system 100 may generate timing signal 108. In some embodiments, PMC 102 may generate timing signal 108. As used and described herein a power state for a CPC is collection of values for operational parameters governing the operation of the CPC. For example, a power state may include values for clock frequency, power supply voltage, cycle skipping, and the like.

PMC 102 includes state machine 109 and registers 110. State machine 109 may be configured to transition through various logical states based on the total power consumption of the CPCs included in the computing system. For example, one case may correspond to PMC 102 waiting for the occurrence of a timing or heartbeat signal, and another logical state may correspond to selecting a new power state for a particular CPC of the computing system. Transitions between the various logical states may be triggered by various events that occur within the computing system, such as, detecting a timing or heartbeat signal, for example.

State machine 109 may be designed according to one of various design styles. For example, state machine may include multiple sequential logic circuits, each include multiple latches or flip-flop circuits. Such latch and flip-flop circuits may be configured to store one or more data bits, which considered collectively, represent a particular one of the various logical states that state machine 109 may hold.

In some cases, a PMC may be a general-purpose processor or processor core, executing multiple program instructions retrieved from memory (not shown). As described below in more detail, the program instructions may be retrieved from a storage location located outside of computing system 100 via a network or other communication medium.

Registers 110 may, in various embodiments, be configured to store voltage and temperature data derived from testing. Registers 110 may be designed according to one of various design styles. For example, registers 110 may include multiple latch or flip-flop circuits, each of which is configured to store a respective data bit of a multi-bit digital data word. In various embodiments, such latches or flip-flops may be either static circuits, dynamic circuits, or any suitable combination thereof.

CPC 104 includes processor cores (or simply "cores") 107a-c. In various embodiments, cores 107a-c may be configured to execute instructions retrieved from memory (not shown) according to a particular instruction set architecture (ISA). In one embodiment, cores 107a-c may be configured to implement the SPARC® V9 ISA, although in other embodiments it is contemplated that any desired ISA may be employed, such as x86, PowerPC® or MIPS®, for example.

In the illustrated embodiment, each of cores 107a-c may be configured to operate independently of the others, such that all cores 107a-c may execute in parallel. Additionally, in some embodiments each of cores 107a-c may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 107a-c may also be referred to as a multithreaded (MT) core.

Clock generator 105 is configured to generate clock signal 106, which is used as a timing reference for CPC 104. In various embodiments, clock generator 105 may include any suitable oscillator circuit, such as, a crystal oscillator, for example. Clock generator 105 may also include one or more phase-locked loop (PLL) or delay-locked loop (DLL) circuit configured to generate a clock signal at a particular frequency. Based on input from PMC 102, clock generator may adjust a frequency of clock signal 106 as part of migrating the power state of CPC 104. Although clock generator 105 is depicted as generating a single clock signal, in other embodiments, clock generator 105 may be configured to generate multiple clock signals.

Power supply 103 includes, in various embodiments, regulator or other suitable circuits configured to generate power supply voltage signals, such as, power supply signal 111, for example. In some embodiments, power supply 103 may include a buck regulator configured to generate a supply voltage at a different voltage level than a primary power supply. Although only a single power supply circuit is depicted in the embodiment of FIG. 1, in other embodiments, multiple power supply circuits, each providing different power supply voltage signals, may be employed. Multiple circuit blocks, such as, e.g., CPC 104, may be coupled to a common power supply signal. In such situations, the multiple circuit blocks are referred to as being in the same "power domain" or "voltage domain."

Temperature sensors 101a-d may, in various embodiments, includes any suitable circuit for detecting temperature of a particular region of computing system 100. In various embodiments, temperature sensors 101a-d may include thermometers or other temperature sensing circuits, in addition to interface or communication circuits for transmitting temperature data to PMC 102. Although depicted as being individual circuit blocks in the embodiment of FIG. 1, in other embodiments, any of temperature sensors 101a-d may be included in other circuit blocks, such as, CPC 104, for example.

It is noted that the embodiment depicted in the block diagram of FIG. 1 is merely an example. In other embodiments, different circuit blocks and different configurations of circuit blocks may be employed.

Figure 2:
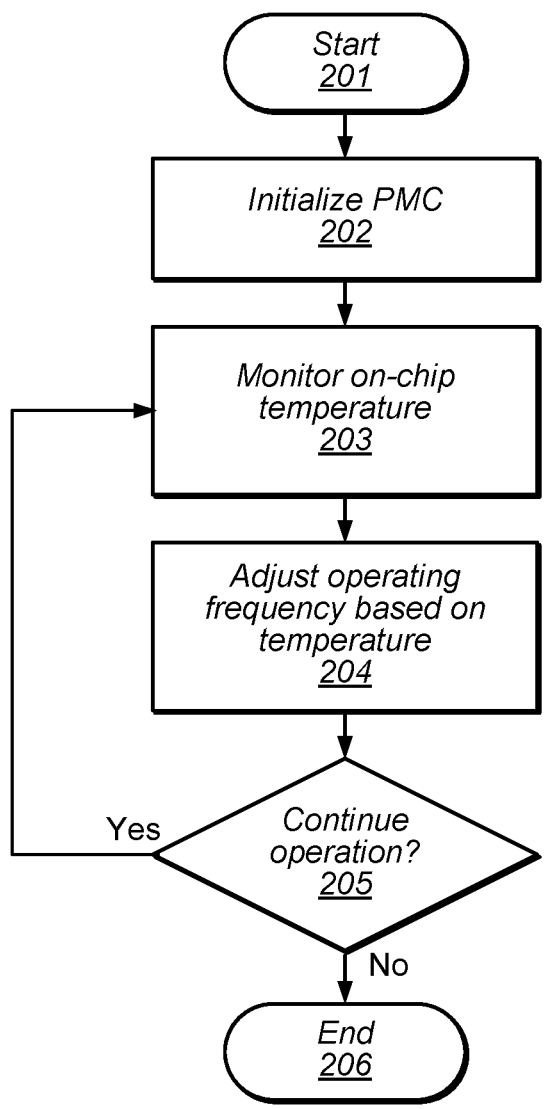

Turning to FIG. 2, an embodiment of method for adjusting performance of an integrated circuit based on temperature is illustrated. Referring collectively to the embodiment of FIG. 1, and the flow diagram of FIG. 2, the method begins in block 201.

PMC 102 may then be initialized (block 201). In various embodiments, state machine 109 may set to a particular state of the available states through which state machine 109 may cycle. Additionally, or alternatively, registers 110 may be reset, cleared, or set to predefined values that are used as part of the performance control process.

PMC 102 may then monitor the on-chip temperature (block 203). As described below in more detail, temperature sensors 101*a-d* may be monitored based on a timing signal (also referred to herein as a "heartbeat signal" or simply a "heartbeat"). In response to the timing signal, temperature sensors 101*a-d* may be activated, their data recorded, then returned to an inactive state to save power.

Using the data from temperature sensors 101*a-d*, an aggregate temperature may be determined, and PMC 102 may then adjust the operating frequency of CPC 104 (block 204). In various embodiments, PMC 102 may instruct clock generator 105 to decrease the frequency of clock signal 106. By reducing the frequency of clock signal 106, cores 107*a-c* may still be able to function even in situations where temperature inversion has occurred reducing the performance of the MOSFETs included in cores 107*a-c*. The method may then depend on whether continued operation is desired (block 205).

If the continued operation is desired, the method may proceed from block 203 as described above, the method may conclude in block 206. It is noted that the embodiment depicted in the flow diagram of FIG. 2 is merely an example. In other embodiments, different operations and different orders of operations may be employed.

A flow diagram depicting an embodiment of a method for gathering temperature data is illustrated in FIG. 3. In some embodiments, the embodiment of the method depicted in FIG. 3 may correspond to block 203 of the flow diagram of FIG. 2. Referring collectively to the embodiment of FIG. 1 and the flow diagram of FIG. 3, the method begins in block 301.

PMC 102 may then monitor for the heartbeat signal (block 302). In various embodiments, the heartbeat signal may be generated by PMC 102. Alternatively, a dedicated timing circuit (not shown) may be employed to generate the heartbeat signal. The method may then depend on whether the heartbeat signal was detected (block 303).

If the heartbeat signal was not detected, then the method may continue from block 302 as described above. Alternatively, if the heartbeat signal was detected, PMC 102 may then gather data from temperature sensors 101*a-d* (block 304). As depicted in FIG. 1, each of temperature sensors 101*a-d* is independently coupled to PMC 102, and may transmit their respective temperature data via a dedicated connection. In other embodiments, temperature sensors 101*a-d* may be coupled to a common bus, over which their respective temperature data may be transmitted to PMC 102 using one of various suitable communication protocols.

Once the temperature information has been gathered, the method may conclude in block 305. It is noted that the embodiment of the method depicted in the flow diagram of FIG. 3 is merely an example. In other embodiments, different operations and different orders of operations are possible and contemplated.

Turning to FIG. 4, a flow diagram depicting an embodiment of a method for adjusting a power state of a CPC is illustrated in FIG. 4. Referring collectively to FIG. 1 and the flow diagram of FIG. 4, the method begins in block 401.

PMC 102 may then determine a voltage level of power supply signal 111 (block 402). In various embodiments, PMC 102 may receive data from power supply 103 indicating the voltage level of power supply signal 111. In other embodiments, PMC 102 may measure the voltage of power supply signal 111 directly.

PMC 102 may then calculate a minimum temperature based on the supply voltage of power supply signal 111 (block 403). In various embodiments, PMC 102 may calculate the minimum temperature based on data gathered during initial testing of the integrated circuit. For example, testing may be performed at various supply voltages, and at each supply voltage, different temperatures may be employed. Such data may be programmed into one or more registers, or other suitable memory location, in PMC 102, or other suitable circuit blocks within the integrated circuit, for use during the calculation of the minimum temperature threshold. The method may then depend on a comparison of a current temperature and the minimum temperature threshold (block 404).

If the current temperature is less than the threshold value, then the power state of at least one CPC, such as, e.g., CPC 104, included in the integrated circuit may be changed to a new power state that has a lower operating frequency (block 408). In various embodiments, PMC 102 may instruct clock generator 105 to reduce a frequency of clock signal 106. Alternatively, or additionally, PMC 102 may instruct CPC 104 to perform cycle skipping. As used and described herein, cycle skipping refers to a mode of operation of a processor or processor core, in which operations are halted (or "skipped") for a number of processor cycles during a period of time. In some embodiments, the period of time may correspond to a particular number of processor cycles. designated number of processor cycles. By reducing the operating frequency of a CPC based on temperature, effects due to temperature inversion may, in various embodiments, be mitigated. The method may then conclude in block 407.

Alternatively, if the current temperature value is not less than the threshold value, the method may depend on a current frequency at which at least one CPC is operating (clock 405). If the current frequency at which at least one CPC is operating is not considered a low frequency, i.e., is not below a frequency threshold value, then the method may conclude in block 407. If, however, the at least one CPC is operating at a low frequency, then PMC 102 may transition at least one CPC to a new power state that includes a higher operating frequency (block 406). As described above, PMC 102 may instruct clock generator 105 to increase the frequency of clock signal 106. The method may then conclude in block 407.

It is noted that the embodiment of the method illustrated in the flow diagram of FIG. 4 is merely an example. In other embodiments, different operations and different orders of operations may be employed.

In some cases, when it is determined a power state of a particular CPC should be changed, a change in power state for the particular CPC may already be pending. When this occurs, the two power state changes may be merged into a single power state change. An embodiment of a method for dealing with a pending power state change is illustrated in the flow diagram of FIG. 5. The method begins in block 501.

A PMC, such as, e.g., PMC 102, may determine a new power state for a particular CPC included in an integrated circuit (block 502). In various embodiments, the PMC may check various performance metrics of the particular CPC, and based on a comparison of the performance metrics to respective limits, determine if a change in power state is necessary, and how the power state change should be implemented. The method may then depend on whether there is another power state change in progress or pending for the particular CPC (block 503).

If there are no other power state changes in progress or pending, then the PMC may transition the power state of the particular CPC to the newly determined state (block 507). The method may then conclude in block 506.

Alternatively, if there is a power state change for the particular CPC currently in progress or pending, then a merged power state may be generated (block 504). In various embodiments, features of both the newly determined power state, and the currently pending power state may be jointly included in the merged power state. For example, if the newly determined power state includes a reduction in clock frequency, and the power state to which the particular CPC is being transitioned (or is currently pending) includes cycle skipping, both the reduction in clock frequency and cycle skipping may be included in the merged power state.

Once the merged power state is determined, the PMC may transition the power state of the particular CPC to the merged power state (block 505). With the transition of the power state of the particular CPC to the merged power state, the method may conclude in block 506.

Although the operations are depicted as being performed in a serial fashion in the embodiment of FIG. 5, in other embodiments, one or more of the operations may be performed in parallel.

Before transitioning a CPC into a new power state, a PMC may check to see if the new power state results in lower power consumption by the CPC. A flow diagram depicting an embodiment of a method for making such a determination is illustrated in FIG. 6. In various embodiments, the method depicted in the flow diagram of FIG. 6 may correspond to at least a portion of either block 406 or block 408 of the flow diagram illustrated in FIG. 4. The method begins in block 601.

As described above, a new power state may be determined for a selected CPC (block 602). Using system settings included in the new power state, a PMC, such as, e.g., PMC 201, may predict the power consumption in either the selected CPC and/or the overall system (block 603). In various embodiments, the PMC may predict the power consumption of the selected CPC using estimates of levels of activity within the CPC based upon the system settings, as well as estimates of leakage power based on the voltage level of the power supply. The method may then depend on a comparison of the predicted power consumption and a programmable threshold (block 604). In some cases, the predicted power consumption of the selected CPC may be compared to a particular threshold value, while the overall system power may be compared to another threshold value. Such threshold values may, in some embodiments, be determined empirically to avoid oscillations between power states.

If the predicted power is less than the threshold value, then the PMC may transition the selected CPC to the new power state (block 605). The method may then conclude in block 606. Alternatively, the predicted power is greater than the threshold value, the transition of the selected CPC to the new power state may be withdrawn (block 607). The method may then conclude in block 606. By estimating the power consumption based on the new power state, the PMC may avoid transitions back and forth between power states, which may consume extra power resulting from the transitions themselves.

It is noted that the embodiment of the method depicted in FIG. 6 is merely an example. In other embodiments, different operations and different orders of operations are possible and contemplated.

Turning to FIG. 7, a block diagram illustrating power management of a computing system is depicted. In the illustrated embodiment, execution threads 702*a-d* communicate with software layer 703. In turn, software layer 703 communicates with virtual functions 704*a-b*, conventional function 705, and power function 707. In various embodiments, virtual functions 704*a-b*, conventional function 705, and power function 707 may be included in the functionality of devices included in a CPC, such as CPC 104 as illustrated in FIG. 1, for example.

Software layer 703 (also referred to herein as a "hypervisor layer") may, in various embodiments, map access requests from execution thread 702*a* to virtual function 704*a*. In a similar fashion, access requests associated with execution thread 702*b* may be mapped to virtual function 704*b*, and thread 702*c* may be mapped to virtual function 704*b*. Additionally, thread 702*d* may be mapped to conventional function 705. Execution thread 702*a* is utilized by guest operating system (GOS) 706*a*, and execution thread 702*b* is utilized GOS 706*b*. Since each of execution threads 702*a* and 702*b* are employed by different GOS instances, the hardware resources are shared between the two GOS instances.

In addition to performing the mapping of requests to functions, power management control software 708, included in software layer 703, may monitor power consumption of individual CPCs included in the computing system. Based on the power consumption of the CPCs, power management control software 708 may change the power state of particular CPCs using power function 707. In various embodiments, power function 707 may set power supply voltage levels, clock frequencies, cycle skipping, or any other suitable operational parameter that may modify the power consumption of a CPC.

It is noted that although only two threads included in two respective GOS are depicted in the embodiment illustrated in FIG. 7, in other embodiments, any suitable number of execution threads and GOS instances may be employed Turning to FIG. 8, a block diagram of one embodiment of a computer system including a resource limiter. The computer system 800 includes a plurality of workstations designated 802*a* through 802*d*. The workstations are coupled together through a network 801 and to a plurality of storage devices designated 807*a* through 807*c*. In one embodiment, each of workstations 802A-802D may be representative of any standalone computing platform that may include, for example, one or more processors, local system memory including any type of random access memory (RAM) device, monitor, input output (I/O) means such as a network connection, mouse, keyboard, and the like (many of which are not shown for simplicity).

In one embodiment, storage devices 807*a*-807*c* may be representative of any type of mass storage device such as hard disk systems, optical media drives, tape drives, ram disk storage, and the like. As such, program instructions included in the power management controller may be stored within any of storage devices 807*a*-807*c* and loaded into the local system memory of any of the workstations during execution. As an example, as shown in FIG. 8, the power management controller software 808 is shown stored within storage device 807*b*.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   one or more processor clusters, wherein a particular processor cluster of the one or more processor clusters includes a plurality of processor cores; and
   a controller circuit configured to:
      in response to receiving a particular signal, monitor an aggregate temperature of the one or more processor clusters;
      generate a comparison of the aggregate temperature of the one or more processor clusters to a threshold value; and
      in response to a determination that the comparison indicates that the aggregate temperature of the one or more processor clusters is less than the threshold value, transition a particular processor cluster of the one or more processor clusters from a current power state to a new power state; and
   wherein the system is configured such that, in the new power state, an operating frequency of the particular processor cluster of the one or more processor clusters is reduced relative to current power state.

2. The system of claim 1, wherein the controller circuit is further configured to determine a current voltage level of a power supply coupled to the particular processor cluster.

3. The system of claim 2, wherein the threshold value is based upon the current voltage level of the power supply coupled to the particular processor cluster.

4. The system of claim 1, further comprising a plurality of temperature sensors, and wherein to monitor the aggregate temperature of the one or more processor clusters, the controller circuit is further configured to receive data from the plurality of temperature sensors.

5. The system of claim 1, wherein to transition the particular processor cluster to a new power state, the controller circuit is further configured to check for pending power state changes for the particular processor cluster.

6. The system of claim 5, wherein the controller circuit is further configured to generate a merged power state based upon the new power state and another power state for the particular processor cluster, in response to determining a transition to the another power state for the particular processor cluster is pending.

7. A method, comprising:
   initializing a power management controller included in an integrated circuit;
   in response to receiving a particular signal, monitoring an aggregate temperature of the integrated circuit;
   generating a comparison of the aggregate temperature of the integrated circuit to a threshold value; and
   in response to determining the comparison indicates that the aggregate temperature of the integrated circuit is less than the threshold value, transitioning a particular processor cluster of one or more processor clusters from a current power state to a new power state, wherein an operating frequency of the processor cluster in the new power state is reduced relative to the current power state.

8. The method of claim 7, further comprising, determining a current voltage level of a power supply coupled to the particular processor cluster.

9. The method of claim 8, wherein the threshold value is based upon the current voltage level of the power supply coupled to the particular processor cluster.

10. The method of claim 7, wherein monitoring the aggregate temperature of the integrated circuit includes receiving data from a plurality of temperature sensors.

11. The method of claim 7, wherein transitioning the particular processor cluster from the current power state to a new power state includes checking for pending power state changes for the particular processor cluster.

12. The method of claim 11, further comprising generating a merged power state based upon the new power state and another power state for the particular processor cluster in response to determining a transition to the another power state for the particular processor cluster is pending.

13. The method of claim 7, further comprising halting the transitioning of the particular processor cluster to the new power state based upon a comparison of a predicted power of the one or more processor clusters based on the particular processor cluster operating using the new power state and a power threshold value.

14. A non-transitory computer-accessible storage medium having programming instructions stored therein that, in response to execution by a computer system, causes the computer system to perform operations comprising:
   initializing a power management controller included in an integrated circuit;
   in response to receiving a particular signal, monitoring an aggregate temperature of the integrated circuit;
   generating a comparison of the aggregate temperature of the integrated circuit to a threshold value; and
   in response to determining the comparison indicates that the aggregate temperature of the integrated circuit is less than the threshold value, transitioning a particular processor cluster of one or more processor clusters from a current power state to a new power state, wherein an operating frequency of the processor cluster in the new power state is reduced relative to the current power state.

15. The non-transitory computer-accessible storage medium of claim 14, wherein the operations further include determining a current voltage level of a power supply coupled to the particular processor cluster.

16. The non-transitory computer-accessible storage medium of claim 15, wherein the threshold value is based upon the current voltage level of the power supply coupled to the particular processor cluster.

17. The non-transitory computer-accessible storage medium of claim 14, wherein monitoring the aggregate temperature of the integrated circuit includes receiving data from a plurality of temperature sensors.

18. The non-transitory computer-accessible storage medium of claim 14, wherein transitioning the particular processor cluster to a new power state includes checking for pending power state changes for the particular processor cluster.

19. The non-transitory computer-accessible storage medium of claim 18, further comprising generating a merged power state based upon the new power state and another power state for the particular processor cluster in response to determining a transition to the another power state for the particular processor cluster is pending.

20. The non-transitory computer-accessible storage medium of claim 14, further comprising halting the transitioning of the particular processor cluster to the new power state based upon a comparison of a predicted power of the one or more processor clusters based on the particular processor cluster operating using the new power state, and a power threshold value.

* * * * *

UNITED STATES PATENT AND TRADEMARK OFFICE
CERTIFICATE OF CORRECTION

PATENT NO.           : 10,365,698 B2
APPLICATION NO.      : 15/661372
DATED                : July 30, 2019
INVENTOR(S)          : YangGong et al.

Page 1 of 1

It is certified that error appears in the above-identified patent and that said Letters Patent is hereby corrected as shown below:

In the Specification

In Column 2, Line 17, delete "functions" and insert -- functions. --, therefor.

In Column 6, Line 27, delete "cycles." and insert -- cycles, --, therefor.

In Column 8, Line 37, delete "employed" and insert -- employed. --, therefor.

Signed and Sealed this
Fourth Day of August, 2020

Andrei Iancu
*Director of the United States Patent and Trademark Office*